United States Patent [19]

Kuipers

[11] Patent Number: 4,742,356

[45] Date of Patent: May 3, 1988

[54] METHOD AND APPARATUS FOR DETERMINING REMOTE OBJECT ORIENTATION AND POSITION

[75] Inventor: Jack Kuipers, Grand Rapids, Mich.

[73] Assignee: McDonnell Douglas Corporation, St. Louis, Mo.

[21] Appl. No.: 806,669

[22] Filed: Dec. 9, 1985

[51] Int. Cl.$^4$ .......................... G01S 5/04; H04N 7/00
[52] U.S. Cl. .................................. 342/448; 342/386; 358/103
[58] Field of Search ............... 343/386, 422, 423, 445, 343/448; 358/103; 434/43, 243

[56] References Cited

U.S. PATENT DOCUMENTS

| Re. 23,397 | 8/1951 | Felch, Jr. | 175/183 |
|---|---|---|---|
| 2,432,858 | 12/1947 | Brown | 250/11 |
| 2,623,924 | 12/1952 | Cartier | 175/182 |
| 2,927,734 | 3/1960 | Vance | 235/189 |
| 3,103,663 | 9/1963 | Parker | 343/108 |
| 3,121,228 | 2/1964 | Kalmus | 343/113 |
| 3,133,283 | 5/1964 | Ghose | 343/100 |

(List continued on next page.)

FOREIGN PATENT DOCUMENTS

| 2328720 | 12/1974 | Fed. Rep. of Germany . |
|---|---|---|
| 557334 | 11/1943 | United Kingdom . |
| 658759 | 6/1948 | United Kingdom . |
| 684229 | 12/1952 | United Kingdom . |
| 724031 | 2/1955 | United Kingdom . |
| 755886 | 8/1956 | United Kingdom . |
| 965326 | 7/1964 | United Kingdom . |
| 1111768 | 5/1969 | United Kingdom . |
| 1157899 | 7/1969 | United Kingdom . |

OTHER PUBLICATIONS

Article: Kalmus, H., A New Guiding & Tracking System, IRE Trans. on Aero Space, Mar. 1962; pp. 7-10.
Mathematics its Contents, Methods & Meanings, pp. 320–330 of vol. III, 2nd Edition published by MIT Press (1969).

Primary Examiner—Theodore M. Blum
Assistant Examiner—David Cain
Attorney, Agent, or Firm—Price, Heneveld, Cooper, DeWitt & Litton

[57] ABSTRACT

A method and apparatus is provided for determining remote object orientation and position with an electromagnetic coupling. A plurality of radiating antennas are provided for radiating electromagnetic energy. Each of the radiating antennas have independent components for defining a source reference coordinate frame. A transmitter is provided for applying electrical signals to the radiating antennas for generating a plurality of electromagnetic fields. The signals are multiplexed so that the fields are distinguishable from one another. A plurality of receiving antennas are disposed on a remote object for receiving the transmitted electromagnetic fields. The receiving antennas have a plurality of independent components for detecting the transmitted electromagnetic fields and defining a sensor reference coordinate frame. An analyzer is provided for receiving the output of the receiving antennas and converting the components of the transmitted electromagnetic fields into remote object position and orientation relative to the source reference coordinate frame. The analyzing means includes means for processing the components of the electromagnetic fields in an uncoupled manner into remote object position and remote object orientation. The processing technique provides an uncoupled, noniterative, closed form solution for both position and orientation which is fast and includes no discontinuities. The processing speed is enhanced with a parallel processing technique which provides for simultaneous determination of the position and orientation parameters. The speed of the processing technique is further enhanced by provision of quaternion solutions for position and orientation. A new virtual real-time binocular computer graphics application is provided which is particularly adapted for generating the cockpit view of an aircraft pilot in a flight simulator.

28 Claims, 4 Drawing Sheets

U.S. PATENT DOCUMENTS

| | | | |
|---|---|---|---|
| 3,187,169 | 6/1965 | Trammell, Jr. | 235/189 |
| 3,354,459 | 11/1967 | Schwartz et al. | 343/100 |
| 3,430,243 | 2/1969 | Evans | 343/112 |
| 3,432,751 | 3/1969 | Godby et al. | 324/13 |
| 3,526,886 | 9/1970 | Lubich | 340/282 |
| 3,529,682 | 9/1970 | Coyne | 175/45 |
| 3,560,977 | 2/1971 | Cayzac | 343/100 |
| 3,589,454 | 6/1971 | Coyne | 175/26 |
| 3,644,825 | 2/1972 | Davis, Jr. et al. | 324/41 |
| 3,656,161 | 4/1972 | MacPherson | 343/100 |
| 3,712,391 | 1/1973 | Coyne | 175/26 |
| 3,731,752 | 5/1973 | Schad | 175/45 |
| 3,821,523 | 9/1974 | Chisholm et al. | 235/150 |
| 3,838,409 | 9/1974 | Minasy et al. | 340/258 C |
| 3,863,256 | 1/1975 | Smith | 343/112 |
| 3,868,565 | 2/1975 | Kuipers | 324/34 R |
| 3,900,878 | 8/1975 | Tsao | 343/112 |
| 3,903,747 | 9/1975 | Johnston | 73/505 |
| 3,906,504 | 9/1975 | Guster et al. | 343/112 |
| 3,952,308 | 4/1976 | Lammers | 343/108 |
| 3,983,474 | 9/1976 | Kuipers | 324/43 |
| 4,017,858 | 4/1977 | Kuipers | 343/100 |
| 4,028,725 | 6/1977 | Lewis | 358/103 |
| 4,054,881 | 10/1977 | Raab | 343/112 |
| 4,072,200 | 2/1978 | Morris et al. | 175/45 |
| 4,092,716 | 5/1978 | Berg et al. | 364/434 |
| 4,134,681 | 1/1979 | Elmer | 364/456 |
| 4,163,977 | 8/1979 | Polstorff | 343/112 |
| 4,197,855 | 4/1980 | Lewin | 128/653 |
| 4,208,024 | 6/1980 | Killpatrick et al. | 244/3.15 |
| 4,212,443 | 7/1980 | Duncan et al. | 73/504 |
| 4,287,809 | 9/1981 | Egli et al. | 89/41 |
| 4,298,874 | 11/1981 | Kuipers | 343/112 |
| 4,314,251 | 2/1982 | Raab | 343/112 |
| 4,328,548 | 5/1982 | Crow et al. | 364/449 |
| 4,346,384 | 8/1982 | Raab | 343/112 |
| 4,394,831 | 7/1983 | Egli et al. | 89/41 |
| 4,396,885 | 8/1983 | Constant | 324/208 |
| 4,424,038 | 1/1984 | Tingleff et al. | 434/2 |
| 4,550,984 | 11/1985 | Reymond | 350/404 |
| 4,613,866 | 9/1986 | Blood | 343/448 |
| 4,657,210 | 4/1987 | Hubert et al. | 244/158 R |

System Block Diagram

Near-Field EM Coupling

SOURCE Frame and Orthonormal Excitation

Position Process

Orientation Process

Parallel Process for Position & Orientation

Vector Relationships in Binocular Computer Graphics

METHOD AND APPARATUS FOR DETERMINING REMOTE OBJECT ORIENTATION AND POSITION

BACKGROUND OF THE INVENTION

The present invention relates generally to remote object position and orientation determining systems employing an electromagnetic coupling and more particularly, is directed to new processing techniques for such systems and the application of such systems to aircraft flight simulators.

Remote object position and orientation determining systems employing electromagnetic couplings are known in the prior art. Such systems are used for tracking and determining the position and orientation of remote objects in a wide variety of applications. However, the processing techniques that have been used in such prior art systems suffer from a number of limitations. The earliest systems were accurate and capable of producing solutions at all attitudes but were iterative processing techniques which slowly converged upon a solution with small angle approximations. Later, noniterative processing techniques were developed which converged faster but which included discontinuities or singularities which prevented the determination of position and orientation solutions for some sensor positions.

SUMMARY OF THE INVENTION

According to the present invention, these and other problems in the prior art are solved by providing a remote object orientation and positioning determining system wherein the accuracy of the earlier iterative processing techniques is achieved in a closed form, uncoupled, noniterative solution for position and orientation. The speed of the processing technique is enhanced with a parallel processing technique which provides for the simultaneous determination of position and orientation parameters. Speed is further enhanced by provision of quaternion solutions for position and orientation.

A remote object position and orientation determining system is provided comprising a plurality of radiating antennas for radiating electromagnetic energy. The radiating antennas are provided with independent components for defining a source reference coordinate frame. A transmitter is provided for applying electrical signals to the radiating antennas which generate a plurality of electromagnetic fields. The electrical signals are multiplexed so that the electromagnetic fields are distinguishable from one another. A plurality of receiving antennas provided for receiving the transmitted electromagnetic fields. The plurality of receiving antennas provide independent components which define a sensor reference coordinate frame. The receiving antennas are disposed on a remote object which is to be tracked. An analyzer such as a digital computer is provided for receiving the output of the receiving antennas and converting the received components of the transmitted electromagnetic fields into remote object position and orientation relative to the source reference coordinate frame. The analyzing means includes a processor for independently converting the components of the received electromagnetic fields into remote object position and orientation. The solution is accurate, fast, and continuous. The processor may comprise two independent processors for independently and simultaneously determining the position and orientation parameters. Speed is further enhanced using quaternion processing to obtain solutions for position and orientation.

The accuracy and speed of the solution render the remote object orientation and position determining system applicable to many new applications. A new virtual image real-time binocular computer graphics application is provided which involves mounting the sensor on the head of a pilot in a flight simulator and driving a pair of video image generators, such as a pair of CRT's, with the pilots head position and orientation to create a cockpit view that is compensated for the position and orientation of the pilot's head.

DESCRIPTION OF THE PREFERRED EMBODIMENTS

APPARATUS

Figure 1A:
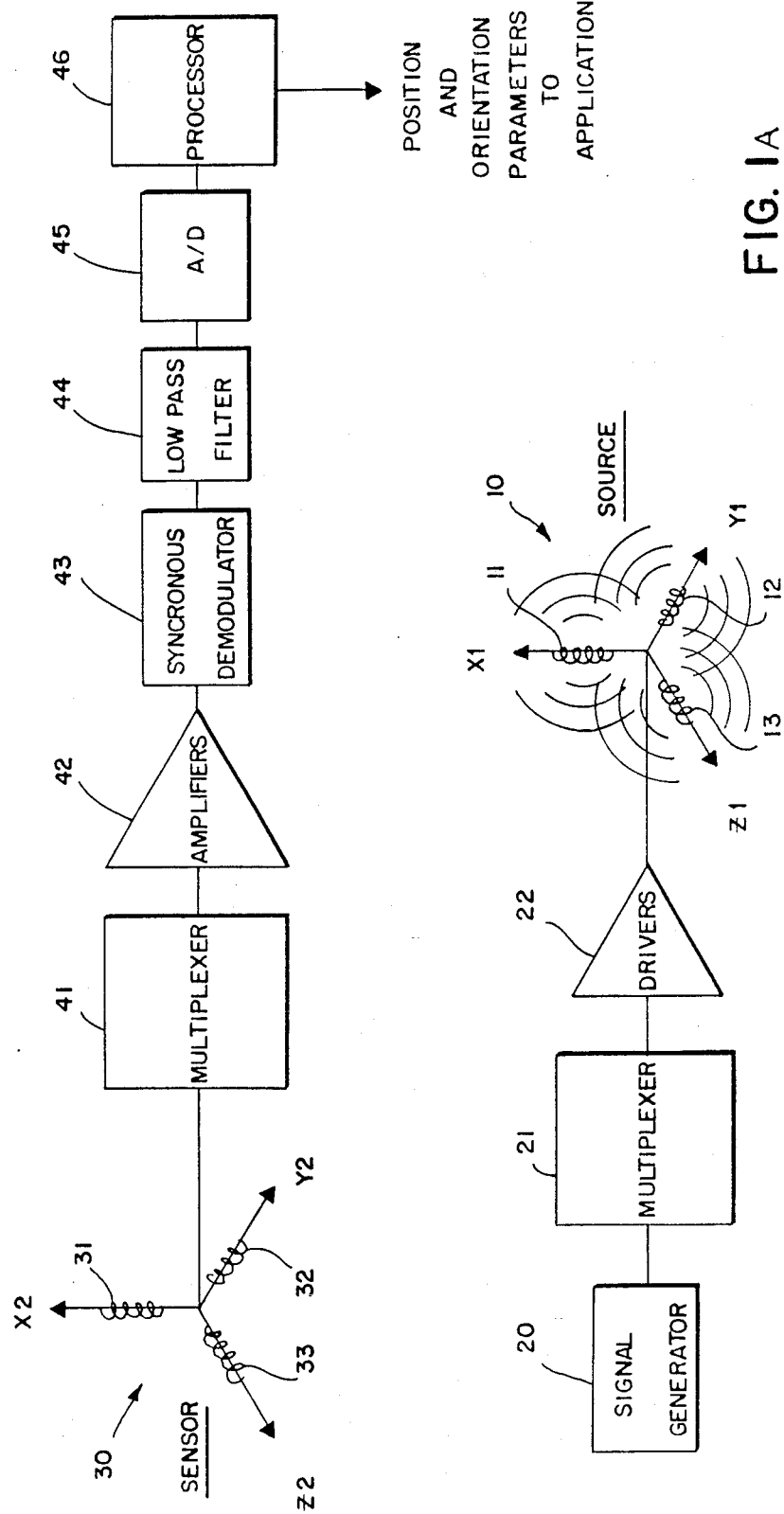
FIG. 1(a) is a functional diagram of the apparatus of the present invention.

With reference now to FIG. 1(a), a functional diagram of the apparatus for determining the position and orientation of a remote object relative to a reference coordinate frame is illustrated. A source of electromagnetic radiation is generally illustrated at 10. The source includes a plurality of radiating antennas 11, 12 and 13. Generally three orthogonal antennas are preferred. However, it is not necessary for the antennas to be orthogonal or for there to be precisely three antennas. What is necessary is that a sufficient number of radiating antennas are provided having independent components which are capable of spanning three dimensional space. In the present embodiment, the system operates in the near field. Magnetic dipole antennas are provided at 11, 12 and 13 which establish quasi-stationary magnetic fields. Quasi-stationary magnetic fields are low frequency fields that vary so slowly with time that radiation effects are negligible. The three magnetic dipoles are orthogonal and normal so that the antennas span three dimensional space. The three antennas, 11, 12 and 13 thus define a source reference coordinate frame identified by the axes X1, Y1, and Z1. Although the present embodiment operates in the near field with loop antennas, it should be appreciated that other embodiments may operate in the far field.

A transmitter is provided for applying electrical signals to antennas 11, 12 and 13 to generate a plurality of low frequency electromagnetic dipole fields, in this case, on the order of 10 kHz. The signals are multiplexed so that the fields emanating from each antenna are distinguishable from the other antennas. For example, functionally the transmitter includes a signal generator 20, a multiplexer 21 and driving amplifiers 22 for supplying power to each of the radiating antennas 11, 12 and 13. In most current embodiments of the invention, the signal generator comprises a sine or cosine generator and the multiplexer comprises a conventional circuit for time division multiplexing the signals applied to each of the radiating antennas. It should be understood that in this case, three driving or power amplifying circuits will be provided, each of the circuits being connected to one of the three radiating antennas 11, 12 or 13 with the multiplexer sequentially applying an excitation signal to each of the antennas through the three individual driving circuits. However, it will be appreciated by those skilled in the art that any one of a number of suitable multiplexing techniques may be employed, including frequency division multiplexing, spread spectrum multiplexing or phase multiplexing and a suitable transmitter for implementing such a multiplexing technique will be provided.

A sensor is provided, generally illustrated by the numeral 30, which comprises a plurality of receiving antennas 31, 32 and 33 for receiving the electromagnetic fields transmitted by the source 10. Since the source 10 employs loop antennas which define magnetic dipole fields, the receiving antennas 31, 32 and 33 are preferably loop antennas. In the present case, it is also preferred that the receiving antennas 31, 32 and 33 span three dimensional space and conveniently, these antennas are disposed on three orthogonal axes X2, Y2 and Z2, respectively. In some embodiments of the invention, it may not be preferable to use three antennas, for example, two orthogonal antennas or an antenna structure which provided the equivalent of two independent components would be sufficient to create six signals from which the six position and orientation parameters of the sensor 30 could be drived. However, in the present case it is considered desirable to provide three orthogonal antennas to provide nine independent measures of the three electromagnetic fields transmitted by the source 10 from which the six independent position and orientation parameters are derived. The receiving antennas 31, 32 and 33 thus define a sensor reference coordinate frame identified by the axes X2, Y2 and Z2, respectively. The outputs of the antennas 31, 32 and 33 are inputted to a multiplexer 41 which in the present case is again preferably a time division multiplexer. In the case of time division multiplexing, it is normally preferable for the multiplexer 21 and the multiplexer 41 to be controlled by a common clock signal so that, for example, when the first source antenna 11 is excited, the components of the electromagnetic field generated by the first source antenna 11 received by each of the three orthogonal receiving antennas 31, 32 and 33 are identified. The output of the multiplexer 41 is then amplified at 42 and inputted to a synchronous demodulator at 43. The synchronous demodulator 43 provides a technique for demodulating the carrier in a way that preserves the sign of the incoming signal. The output of the synchronous demodulator 43 goes through a low pass filter 44 which smooths the signal providing a DC output. An analog to digital (A/D) conversion is provided at 45. However, it should be appreciated that a state of the art signal processing chip could be used to replace the synchronous demodulator and the low pass filter. In this case, the A/D converter would precede the processing chip. The signal set from the A/D converter 45 is then inputted to a suitable processor 46 where the position and orientation parameters of the sensor 30 relative to the source 10 are determined. Normally, the processor 46 provides the clock signals for switching the multiplexers and adjusts the gain of the amplifiers and/or drivers to provide automatic gain control.

The processor or analyzer 46 as hereinafter described may actually comprise as many as three independent digital processors. For example, in embodiments featuring a parallel processing technique for simultaneously determining position and orientation (see FIG. 6), a first processor 60 may be provided for normalizing the sensor signals, a second processor may be provided at 70 for determining position and a third processor may be provided at 80 for determining orientation. The position and orientation processors 70 and 80, respectively, operate independently with separate clocks to simultaneously determine the position and orientation parameters as fast as possible. This processing technique has particular application to virtual image real-time computer graphics and a flight simulator later described.

The remote object position and orientation determining system of the present invention has a wide variety of other applications. For example, the sensor 30 can be associated with the stylus of a three dimensional digitizer which is used to trace a physical model or the like and generate a digital database. The resulting database can then be used to generate a wide variety of computer generated images of the physical model. For example, the database created by tracing the physical model may be used to develop engineering and layout drawings. In plant design for example, the database may be used to compile parts lists and may interface with additional software to accomplish various engineering tasks. Applications for such three dimensional digitizers are found in such diverse industries as architect engineering, shoe design and plastic bottle manufacturing. In another application, the digital databases created by tracing the physical models can be used to generate complex computer generated imagery in the film making art. In still another application, the sensor can be associated with a particular body part for the purpose of conducting biomechanical studies. In an important military application, the sensor is associated with the helmet and sighting reticle of the pilot of a military aircraft for determining the line of sight of the pilot to the target and thereafter initializing ordinance which is directed along the line of sight to the target. In the field of aviation generally, the system can be employed as an aircraft landing aid, the sensor being associated with the aircraft and the source reference coordinate frame being associated with a target landing area. Still another application involves the monitoring of the body movements of an invalid for the purpose of creating a nonverbal communication system or providing a technique for remotely controlling various devices with nonverbal communicative body motion. It should be appreciated that in many of these applications, the accuracy and speed of the processing technique for converting the signal set received by the remote object into remote object position and orientation is critical to the success of the application. This is particularly true, for example, in cases where the pilot of a military aircraft travelling at several hundred miles an hour is attempting to initialize ordinance to be delivered to a target within the reticle of his helmet mounted sight.

PROCESSING

INTRODUCTION

According to the present invention, a process is provided which uses electromagnetic dipole fields generated in one body and detected in a remote body, to measure the position and/or orientation between the two independent bodies. All six degrees-of-freedom (i.e., both translation and rotation) are measured, which define how one body is "situated" relative to the other. Algorithms are derived which enable one to compute each of these six degrees-of-freedom based only upon the detected signal set.

Figure 1:
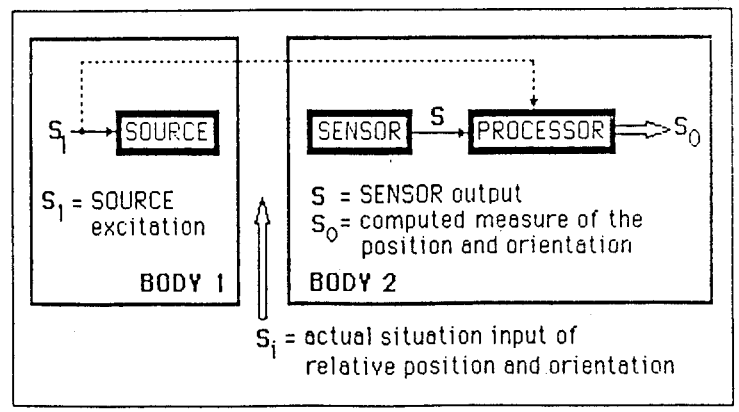
FIG. 1 is a simple system block diagram of the invention.

As previously noted, three essential components comprise this system: a source (radiator) 10 which generates an electromagnetic field, a similar compatible sensor 30, and a processor 45. Typically, these components are distributed as illustrated in FIG. 1. A 3-axis electromagnetic dipole source is fixed in body 1; it generates a sequence of variously polarized or multiplexed electromagnetic fields. These vector fields are detected by a similar 3-axis dipole sensor fixed in some remote body 2. The set of source excitations $S_1$ and the corresonding set of sensor signals S are correlated by the processor to give a precise measure of the relative position and/or or the relative orientation between the two independent bodies.

ELECTROMAGNETIC FIELD COUPLING

Figure 2:
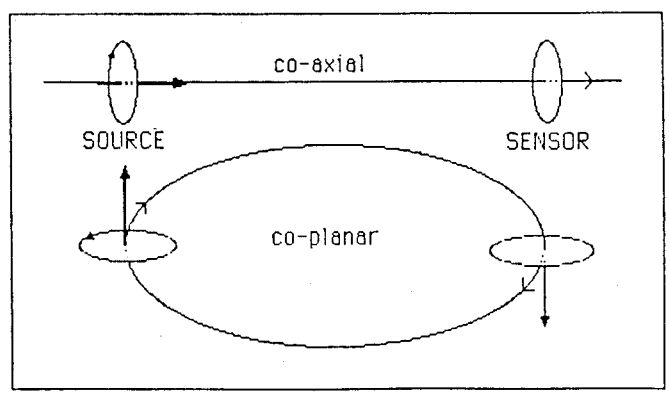
FIG. 2 illustrates the near field electromagnetic coupling between two loop antennas.

With reference to FIG. 2, a simple coil (source) excited by a current generates an electromagnetic (EM) field. In free-space this EM field has a polar axis of symmetry which is normal to and centered in the plane of the coil. The structure of this EM field may be regarded as the familiar concurrent toroidal loci of generally circular flux lines all issuing from and returning to the plane circular area enclosed by the coil. The intensity and direction of the field is conveniently represented by a vector whose magnitude is proportional to the excitation current and whose direction is normal to the plane of the coil (in the right hand sense).

Figure 3:
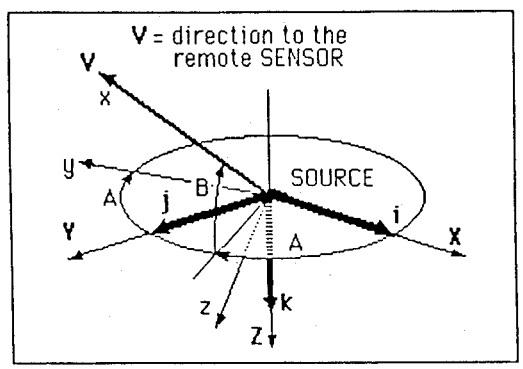
FIG. 3 illustrates the source frame and the orthogonal excitation.

Consider two simple "flat" circular coils whose physical dimensions are very small compared to their separation distance. Let one coil be the source and the other the relatively remote sensor. Then, at any fixed separation distance where near-field conditions prevail, the magnitude of the signal detected by the sensor when the two coils are coaxial is twice that detected by the sensor when the two coils are coplanar. Moreover, if the axial coupling is positive, then (after rotating both planes 90 degrees in the same direction) the coplanar coupling is negative (FIG. 2). This fundamental property of EM field coupling in the near-field is crucial to the measurement strategy. Consider the three orthonormal excitations denoted i, j and k, of a 3-axis source as shown in FIG. 3. This sequence of excitations is conveniently represented by the column vectors of the (standard basis) identity matrix I. But, since the remote sensor is in the direction of the vector V, each of these source excitations must first be resolved into its axial and two normal components with respect to the direction V (the axial direction). The relative coupling coefficient of each of these resolved components can then be appropriately designated as 2, $-1$, and $-1$, respectively. The near-field coupling of a source with a remote sensor is therefore clearly dependent upon angular rotations, A and B. The composite transformation is efficiently represented by the matrix P, or more explicitly, $$P = \begin{bmatrix} \cos B & 0 & -\sin B \\ 0 & 1 & 0 \\ \sin B & 0 & \cos B \end{bmatrix} \begin{bmatrix} \cos A & \sin A & 0 \\ -\sin A & \cos A & 0 \\ 0 & 0 & 1 \end{bmatrix} = \quad (1)$$

$$\begin{bmatrix} \cos A \cos B & \sin A \cos B & -\sin B \\ -\sin A & \cos A & 0 \\ \cos A \sin B & \sin A \sin B & \cos B \end{bmatrix}$$

This we call the tracking transformation. The position of the remote sensor with respect to the source frame is defined in terms of these two angles, AS and B, by the polar triplet (R,A,B). The range, R, in this triplet, is measured using an "inverse-cube-attenuation-with-range" scheme. This scheme for measuring the range, R, is discussed later.

As already stated, the matrix P takes the three source excitation vectors into an axial and two normal components defined in the tracking frame. A similar or dual transformation $Q = AP^t$ takes these axial and normal components of the field from the tracking frame to the sensor frame where $$A = \quad (2)$$

$$\begin{bmatrix} 1 & 0 & 0 \\ 0 & \cos R & \sin R \\ 0 & -\sin R & \cos R \end{bmatrix} \begin{bmatrix} \cos E & 0 & -\sin E \\ 0 & 1 & 0 \\ \sin E & 0 & \cos E \end{bmatrix} \begin{bmatrix} \cos H & \sin H & 0 \\ -\sin H & \cos H & 0 \\ 0 & 0 & 1 \end{bmatrix}$$

This is one of twelve possible Euler angle/axis sequences for the matrix A. In this instance, we have adopted the common aerospace sequence of Euler angle rotations, namely, Heading (H), Elevation (E), and Roll (R), about the axis: z, y, and x, respectively. The matrix product, in this case, is $$A = \begin{bmatrix} \cos H \cos E & \sin H \cos E & -\sin E \\ \cos H \sin E \sin R - \sin H \cos R & \sin H \sin E \sin R + \cos H \cos R & \cos E \sin R \\ \cos H \sin E \cos R + \sin H \sin R & \sin H \sin E \cos R - \cos H \sin R & \cos E \cos R \end{bmatrix} \quad (3)$$

These two rotation matrices, P and A, provide the means for relating the source frame to the tracking frame and then finally the tracking frame to the sensor frame. Using these transformations, signals which are detected by the 3-axis orthonormal sensor, as a result of a time-multiplexed sequence of three orthonormal excitations applied at the source, become the three (3) column vectors in the 3×3 signal matrix, $$S = kAP^t HP = kQHP \quad (4)$$

where $Q = AP^t$ takes vectors from the Tracking to the SENSOR frame

A = the orientation matrix, SENSOR frame wrt SOURCE frame
P = the tracking matrix, SENSOR frame wrt SOURCE frame
H = the coupling matrix = $dg(2, -1, -1)$, for near-field
k = the EM field coupling/attenuation factor.

Equation (4) can also be expressed using quaternions (denoted by equivalent lower-case letters, in general), instead of matrices. Then $$S = kQHP = kq^{-1}[H(p^{-1}Ip)]q \qquad (5)$$

where
I = the identity matrix
and
$q = p^{-1}a$ in quaternion representation

The properties and algebra of quaternions are well known. Historically, the first hypercomplex system that was discussed in mathematics is the system of quaternions, i.e, "four-fold numbers" which was introduced by the Irish mathematician Hamilton. Quaternions can be described as follows. For the quadruplets (1,0,0,0), (0,1,0,0), (0,0,1,0), (0,0,0,1) we introduce the abbreviations 1, i, j, k. Then the equation:

$$(a,b,c,d) = a(1,0,0,0) + b(0,1,0,0) + c(0,0,1,0) + d(0,0,0,1)$$

Every quaternion can be uniquely represented in the form:

$$(a,b,c,d) = a1 + bi + cj + dk$$

Some important quaternions are set forth in the last section herein. Other references are available. For example, see, at pages 320 et seq of Volume 3, 2nd ed. of *MATHEMATICS ITS CONTENT METHODS AND MEANING*, published by the M.I.T. Press in 1969, Volumes 1, 2 and 3 of which are hereby incorporated by reference. We now "normalize" the signal matrix S.

NORMALIZATION

The magnitude of the signals detected by the 3-axis sensor, under near-field conditions, varies inversely with the cube of the distance between source and sensor. This inverse cube relationship is the basis of the method we will use to measure the distance between source and sensor.

There are two important reasons why we must first determine the value of the attenuation factor "k", in equation (4):
(1) The signal matrix S is "normalized" (which means dividing S by "k") in order to derive simple uncoupled algorithms for relative position and orientation, P and A, or their equivalent, respectively.
(2) The basis for implementing an open-loop or regulated measure of the distance between the source and sensor is implicit in the value of "k".

We determine k as follows. Let $$U = S^tS = k^2P^tH^2P \qquad (6)$$

The trace of the matrix $S^tS$, denoted $tr(S^tS)$, is merely the sum of the terms on the main diagonal of the matrix U, which in this case must equal $6k^2$, or, which is the trace of the right-hand side of equation (6). Therefore, $$k = [tr(U)/6]^{(\frac{1}{2})} \qquad (7)$$

Dividing the signal matrix S by k gives the normalized signal matrix $$M = AP^tHP \qquad (8)$$

The measurement of the Range, R, or the distance between the source and the sensor, uses the computed value for k in the following open-loop range measurement scheme. We assume that the excitation of the source is well regulated and that the electronic attributes of the system are consistent with maintaining precise open-loop calibration and measurement over a wide dynamic range. Let $k_o$ be the value for k in equation (7) which corresponds to range $R_o$, the reference range (distance source to sensor). Then, since in the near-field, k varies inversely with range R we can define range to be $$R = R_o(k_o/k)^{(\frac{1}{3})} \qquad (9)$$

Next, we analytically uncouple the position and orientation information which is resident in the $3 \times 3$ normalized signal set, M. In this analysis matrix operators are employed simply because they are better understood and can be dealt with more intuitively.

PRELIMINARY ANALYSIS

Orthogonal matrices P and A represent the unknown rotations in M which are to be determined by processing the information resident in the signals detected by the sensor. Without compromising generality, we assume that both source and sensor are three-axis, orthonormal, electromagnetic field generating and sensing devices, respectively. And we also assume the orientation of the sensor frame to be coincident with, and hence the sensor frame represents, the primary coordinate frame of the body or object on which it is mounted; same for the remote source. In the signal matrix $$M = AP^tHP$$

where
$H = dg(2, -1, -1) = 3E_1 - I$
and
$E = dg(1,0,0)$
I = identity matrix

With this representation for H, we compute $$M^tM = 3X + I \qquad (10)$$

and $$A^tM = 3X - I \qquad (11)$$

where
$X = P^tE_1P$

Equation (10) can be solved directly for X, which is function of P only, that is, X is independent of A, to give $$X = P^tE_1P = (M^tM - I)/3 \qquad (12)$$

Subtracting (10) from (11) gives the orientation A independent of P to give $$A^tM = M^tM - 2I \qquad (13)$$

or
ti $A^t = M^t - 2M^{-1} \qquad (14)$

It should be noted that solving for P, using matrix methods on equation (12), may result in hemispheric ambiguity. This ambiguity is a limitation of the structure of the electromagnetic fields. A sensor displaced 180 degrees about the origin and in the same orientation will produce an identical signal set. Thus, additional information is required to resolve this hemispherical ambiguity.

In summary to this point, the three column vectors of the signal matrix S represent attenuated signals detected by the 3-axis sensor. These signal vectors are a result of the corresponding three orthonormal excitations applied at the remote 3-axis source. The $3 \times 3$ signals set at the sensor is "normalized" and the resulting measure of the attenuation factor "k" provides the means for implementing an open-loop or regulated measure of the distance. The "normalized" signal set M is the input to the system process. Algorithms, (12) and (14), provide means for determining precise measures of the relative orientation and the relative position of the sensor, respectively, with respect to the frame of the remote source. And although it is obvious that (12) or (14) could be solved directly using matrix methods, we present alternative quaternion processes referred to earlier. These various algorithms or processes can be used in a variety of possible configurations, depending upon the application.

Using the independent position and orientation algorithms, three alternative quaternion processes are presented. These various processes give a precise measure of:
(1) Position only, or
(2) Orientation only, or
(3) Both position and orientation, as a
  (a) Serial process, or
  (b) Parallel process The parallel processor which determines both position and orientation is very time-efficient and would be particularly appropriate for certain "real-time" computer graphics applications, for example. This application will be discussed further, after we present the processes listed above.

A QUATERNION PROCESS FOR POSITION ONLY

Figure 4:
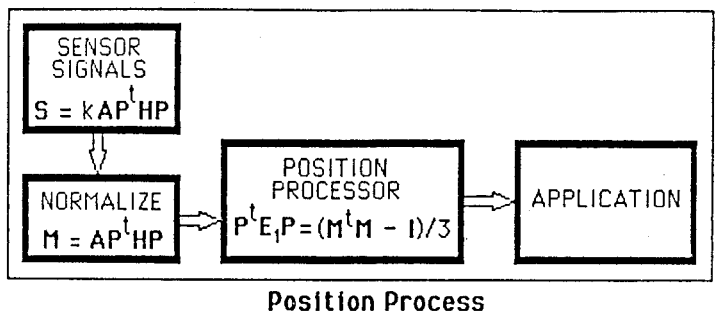
FIG. 4 is a functional diagram for an uncoupled process for determining position.

With reference to FIG. 4, based upon equation (12) the strategy for the quaternion process which yields a precise measure of the relative position of the sensor relative to the remote source is established. The right-hand use of (12) is processed using an estimate of the quaternion p, denoted $\underline{p}=\underline{p}c^{-1}$, where c is the error quaternion which relates the quaternion p and its estimate, $\underline{p}$. The error quaternion c is $$c = c_o + \bar{c}$$

where ultimately, with successive iterations, $\bar{c}$ approaches zero and $c_o$ approaches 1, which means the estimated quaternion approaches the actual quaternion. We now proceed with the process. First, we write equation (12) partially in terms of the quaternion p, to give:

$$X = p(E_1 P)p^{-1} = (M^t M - I)/3 \tag{16}$$

where X is a known function of the normalized signal matrix M, as shown. The process objective is to determine the quaternion p. Operating on (16) with the best estimate of p, denoted $\underline{p}$, gives $$(X1) = \underline{p}^{-1} X \underline{p} = c(E_1 P)C^{-1} \tag{17}$$
$$= (1 - 2C)(E_1 P) \tag{18}$$

It is convenient to write equation (17) in its equivalent matrix form (18) where $$C = \begin{bmatrix} 0 & c_3 & -c_2 \\ -c_3 & 0 & c_1 \\ c_2 & -c_1 & 0 \end{bmatrix} \tag{19}$$

Taking the transpose of both sides of equation (18) and then again expressing the matrix P in terms of its equivalent quaternion p, gives $$(X1)^t = p[E_1(I+2C)]\underline{p}^{-1} \tag{20}$$

Now, operating on equation (20), as before, with the best estimate of p, gives $$\underline{p}^{-1}[(X1)^t]\underline{p} = (1 - 2C) E_1 (1 + 2C) \tag{21}$$
$$= E_1 + 2E_1 C - 2CE_1 - 4CE_1 C \tag{22}$$

Since the vector part of the tracking error quaternion c is assumed to be small compared to one, the last term on the right-hand side of (22) is taken to be negligible. The right-hand side of (22) then becomes the matrix $$\begin{bmatrix} 1 & 2c_3 & -2c_2 \\ 2c_3 & 0 & 0 \\ -2c_2 & 0 & 0 \end{bmatrix} \tag{23}$$

The left-hand side of equation (22) is the result after operating on the known matrix X with the estimated tracking quaternion $\underline{p}$, twice, as indicated above. The numerical values of the elements of the resulting matrix, on the left-hand side of (22), are used with (23) to evaluate $c_2$ and $c_3$.

It could be argued that since the tracking transformation involves only two rotations, and if these two tracking angles are the conventional tracking azimuth and tracking elevation, then the $c_1$ component of the tracking error quaternion may be computed as, $c_1 = c_2 c_3$ (where we take $c_o = 1$). However, recall that at the outset the vector part of the tracking error quaternion was assumed small. Therefore, the product of two of its components would be exceedingly small and it is justified that we let $c_1 = 0$.

Using the computed values for $c_2$ and $c_3$, the resulting tracking error quaternion is, $$c = c_o + \bar{c} = c_o + c_2 j + c_3 k \tag{24}$$

We now can compute a new estimated tracking quaternion, $\underline{p}$, by making $$\underline{p} = (\underline{p}_{new}) = (\underline{p}_{old})c \tag{25}$$

Repeating this process indefinitely or until the vector part of the tracking error quaternion gets to be sufficiently small results in a quaternion which represents the relative position of the sensor. The $p_1$ component of the tracking quaternion must satisfy the relationship $$p_1 = -(p_2 p_3)/p_o \qquad (26)$$

Before we present the process for the orientation quaternion it should be emphasized that the 2nd equality in (12) also could be computed directly to give an "openloop", that is, noniterative measure of trigonometric functions of the tracking angles. In particular, the three polar coordinate representations of the corresponding cartesian coordinates which locate the sensor in the source frame are directly available.

As we shall see, this cartesian triplet which represents position can be directly applied in the Computer Graphics Application (discussed in detail below). In the computer graphics application the three values of the cartesian triple are required in the translation matrix (in its homogeneous coordinate representation).

Although this direct method does not use quaternions, it is developed further at this point as an option for the computer graphics application discussed later. We expand the expression $X = P^t E_1 P$ in equation (12) to give $$X = [x_1, x_2, x_3]$$

where the $x_k$'s are the columns of the matrix X, functions of angles A and B. The explicit expressions of these column vectors is $$x_1 = (\cos A \cos B) colu$$

$$x_2 = (\sin A \cos B) colu \qquad (27)$$

$$x_3 = (-\sin B) colu$$

where
$$u = (\cos A \cos B)i + (\sin A \cos B)j + (-\sin B)k$$

In many applications a practical restriction on the domain for the angle A is that $\cos A > 0$, in other words, the sensor is located in the forward-looking hemisphere of the source frame. Also, by definition $\cos B > 0$. Then from the diagonal elements in the matrix X we can get the cartesian coordinates of the sensor position (location) in the source frame, $$x = R \cos A \cos B = R \, sqr \, (x_{11})$$

$$y = R \sin A \cos B = R \, sgn \, (x_{21}) \, sqr \, (x_{22}) \qquad (28)$$

$$z = R \sin B = -R \, sgn \, (x_{31}) \, sqr \, (x_{33})$$

where:
sqr = square root
sgn = algebraic sign of the term it precedes, that is, + or −.
where (x,y,z) represents the cartesian coordinates of the sensor location in the source frame, and where R is the distance measure source to sensor, see equation (9).

A QUATERNION PROCESS FOR ORIENTATION ONLY

Figure 5:
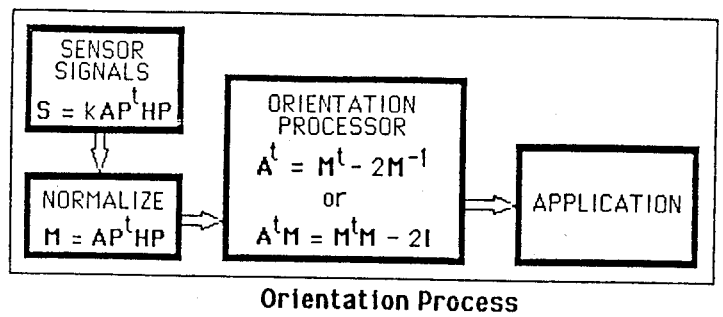
FIG. 5 is a functional diagram for an uncoupled process for determining orientation.

With reference to FIG. 5, equation (14) defines the transpose of the orientation rotation matrix A in terms of the known signal matrix M and its inverse as, $$A^t = M^t - 2M^{-1} \qquad (14)$$

Although the matrix M is non-singular the processes which are required to compute $M^{-1}$ involve some non-trivial computation time. Alternatively, it turns out that operating on equation (13), namely, $$A^t M = M^t M - 2I \qquad (13)$$

using quaternions is much more efficient and results in the orientation quaternion, a. This process is now described.

We first rewrite equation (13) in terms of the desired quaternion, $a = a_o + \underline{a}$, to give $$aMa^{-1} = M^t M - 2I = Y \qquad (29)$$

The processing strategy in this instance is the following. As before, we will estimate the orientation quaternion, $\underline{a}$. Then using this estimate, we will operate on both sides of (29). The right-hand side will give a 3×3 set of numbers; the left-hand side should approach the known matrix M as the quaternion estimate $\underline{a}$ approaches the actual quaternion, a. The difference after each iteration provides a measure of each of the components of the vector part of the orientation error quaternion, $u = u_o + \underline{u}$, where $u_o$ approaches one (1) and $\underline{u}$ approaches zero as was the case with the tracking error quaternion c; see Equation (11). We now operate on both sides of (29) with $\underline{a} = au^{-1}$ to give $$uMu^{-1} = \underline{a}^{-1} Y \underline{a} = (I - 2U)M \qquad (30)$$

Solving the second equality in (24) gives $$UM = (M - \underline{a}^{-1} Y \underline{a})/2 = D \qquad (31)$$

The right-hand side of (31), D, consists of a 3×3 set of known/computed numbers. The left-hand side is a 3×3 set of linear combinations of the components of the vector part of the orientation error quaternion, $u = u_o + \underline{u}$. In order to solve for the vector u, three independent equations from the nine dependent equations represented in (31) must be chosen. Let these three equations be written in the form $$GU = d \qquad (32)$$

where
u = col($u_1$, $u_2$, $u_3$) = error quaternion (vector part)
d = column vector from elements of D
G = a 3×3 matrix of elements from M which are the coefficients of three linear elements in UM, chosen such that singularity of G is unlikely in any likely orientation.

The solution of (32) determines the orientation error quaternion, $u = u_o + \underline{u}$. Using this error quaternion u, we compute a better estimated orientation quaternion, $\underline{a}$, using $$\underline{a} = \underline{a}_{new} = (\underline{a}_{old})u \qquad (33)$$

We then repeat the process indefinitely or until the magnitude of u gets to be sufficiently small. The values for the estimated orientation quaternion, $\underline{a}$, converge rapidly to the "actual" orientation quaternion. Then the orientation quaternion, a, can be used directly in a larger control process or it can be used to express an equivalent set of three Euler angles or an equivalent Direction Cosine matrix, or whatever is required by the application.

A QUATERNION PROCESS FOR THE SIMULTANEOUS DETERMINATION OF POSITION AND ORIENTATION

The process for getting both position and orientation can take two forms. Clearly, one could concatenate the two separate processes, described above, which yield orientation only and position only. Alternatively, we now present a process on (4) which will simultaneously determine both the tracking and the orientation quaternions. Recall the quaternion representation for the signal matrix $$S = kQHP = kq^{-1}[H(p^{-1}Ip)]q \quad (5)$$

or after "normalization" we have $$M = q^{-1}[H(p^{-1}Ip)]q \quad (34)$$

We now adopt the same strategy as used above except that we now estimate both the quaternion q and the tracking quaternion p and again denote them $\underline{q}$ and $\underline{p}$, respectively, such that $$q = e\underline{q} \text{ or } \underline{q} = e^{-1}q \quad (35)$$

and $$p = \underline{p}c \text{ or } \underline{p} = pc^{-1} \quad (36)$$

These estimates are now used to process the normalized signal matrix M. The strategy in this process is to undo the coupling and the two quaternion transformations indicated in (34) using both of the improved quaternion estimates after each iteration, in an effort to ultimately get the required identity I. The errors in the estimates after each iteration will appear as non-zero off-diagonal elements in the matrix which represents the computed "identity".

The first step in the process is to "undo" the quaternion q with its best estimate $\underline{q}$. To do this we compute $$M1 = \underline{q}M\underline{q}^{-1} = e^{-1}HPe = (I + 2E)HP \quad (37)$$

The next step is to "undo" the coupling matrix H from M1. To do this we compute $$M2 = H^{-1}(M1) = (I + 2Z)P \quad (38)$$

where $$Z = H^{-1}EH \quad (39)$$

We now take the transpose of M2 to give $$M3 = (M2)^t = p^t(1 - 2Z) = p(1 - 2Z)p^{-1} \quad (40)$$

and then we "undo" the quaternion p using the best estimate $\underline{p}$, to give $$M4 = \underline{p}^{-1}(M3)\underline{p} = c(1 + 2Z)c^{-1} \quad (41)$$
$$= (1 - 2C)(1 - 2Z)$$

Finally $$M5 = (M4)^t = 1 + 2Z + 2C + 4ZC \quad (42)$$
$$= [\underline{p}^{-1}(H^{-1}(\underline{q}M\underline{q}^{-1}))^t\underline{p}]^t \quad (43)$$
$$= \text{identity (except for the quaternion errors)}$$

The matrices C and E are skew-symmetric matrices whose elements are made-up of the elements of the tracking quaternion error and the orientation quaternion error, the $c_k$'s and $e_k$'s, respectively, for k = 1, 2, 3. The 4th term on the right side of (42) is a second order error term and is assumed negligible. We now expand the right side of (42) in order to identify the off-diagonal error terms in (43). This gives $$M5 = V = \begin{bmatrix} 1 & 2c_3 - e_3 & -2c_2 + e_2 \\ -2c_3 + 4e_3 & 1 & 2c_1 + 2e_1 \\ 2c_2 - 4e_2 & -2c_1 - 2e_1 & 1 \end{bmatrix} \quad (44)$$

Each element of the matrix M5, as defined by the process (43) corresponds to those specified by (42) and (44). We then compute the elements of the error quaternions c and e to be $$\begin{array}{ll} c_0 = 1 & e_0 = 1 \\ c_1 = 0 & e_1 = (v_{23} - v_{32})/4 \\ c_2 = -(v_{31} + 4v_{13})/6 & e_2 = -(v_{13} + v_{31})/3 \\ c_3 = (v_{21} + 4v_{12})/6 & e_3 = (v_{12} + v_{21})/3 \end{array} \quad (45)$$

The new estimates for the quaternions p and q are $$\underline{p} = \underline{p}_{new} = (\underline{p}_{old})c \quad \underline{q} = \underline{q}_{new} = (\underline{q}_{old})e \quad (46)$$

and the process is repeated either continuously or until the error becomes sufficiently small. Then, using the definitions stated with Equation (5), the orientation quaternion, a, is computed as the quaternion product $$a = pq \quad (47)$$

Next, we describe a more time-efficient parallel processor which gives a precise measure of both position and orientation (but requires more hardware).

A QUATERNION PROCESS FOR PARALLEL DETERMINATION OF BOTH POSITION AND ORIENTATION

Figure 6:
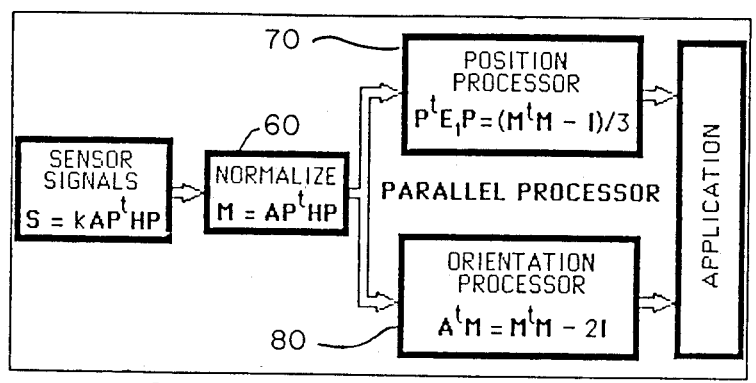
FIG. 6 is a functional diagram for simultaneously determining position and orientation in parallel processors.

This process also computes position and orientation simultaneously but it uses a parallel arrangement of two of the processors described earlier, namely, the position (only) process and the orientation (only) process, as shown in FIG. 6. This parallel process is possible because algorithms for the position and orientation were uncoupled. This particular implementation is optimal for those applications which require "real-time" response. Computer graphics or computer generated images which display physical objects or environments is such an application. This application will be discussed further below.

HELMET-MOUNTED SIGHT APPLICATION

In this application the 3-axis source is fixed at some convenient point in the aircraft cockpit and precisely oriented to the aircraft (or reference) coordinate frame.

The 3-axis sensor may be embedded in the pilot's helmet. The operating system determines a precise measure of the direction of the pilot's line-of-sight (LOS) with respect to the reference frame of the aircraft. This means, of course, that an optical sight must also be fixed to the helmet. Furthermore, this sight must be properly boresighted with respect to the helmet and sensor, including the individual physical characteristics of the pilot.

In those applications which require maximum frequency response, the computation-time required to compute both position and orientation (if both are require) may be reduced substantially by using parallel processors.

COMPUTER-GENERATED IMAGERY APPLICATION

The measurement system herein described may provide the position and orientation information necessary in many virtual "real-time" computer graphics man-machine applications. And parallel processing, which employs the independent algorithms for position and orientation presented earlier may substantially improve the system response. See FIG. 6.

The algorithms needed to generate the desired graphics are usually derived using homogeneous coordinates because then all of the transformations are multiplicative. Of the several canonical transformations generally employed in computer graphics, two, namely rotation and translation, consume most of the computation time. It is therefore important that a very efficient measurement scheme and process algorithm be employed. These translation and orientation transformations, expressed in homogeneous coordinates are:

$$\text{Translation} = \begin{bmatrix} 1 & 0 & 0 & | & x \\ 0 & 1 & 0 & | & y \\ 0 & 0 & 1 & | & z \\ \hline 0 & 0 & 0 & | & 1 \end{bmatrix}$$

$$\text{Rotation} = \begin{bmatrix} & & & | & 0 \\ & A & & | & y \\ & & & | & 0 \\ \hline 0 & 0 & 0 & | & 1 \end{bmatrix}$$

where the matrix A is the orientation transformation or alternatively its quaternion equivalent, discussed above. In the translation matrix, $x = R \cos A \cos B$ $y = R \sin A \cos B$ (50)

$z = R \sin B$

Recall, a derivation of this cartesian coordinate triplet was presented earlier and defined in (28).

We now present a brief discussion of a binocular graphics application in the context of the position and orientation measurement system described herein. The two algorithms which are illustrated in the parallel processor of FIG. 6 and feeding into a block called "application," provide the necessary "real-time" rotation and translation information.

Figure 7:
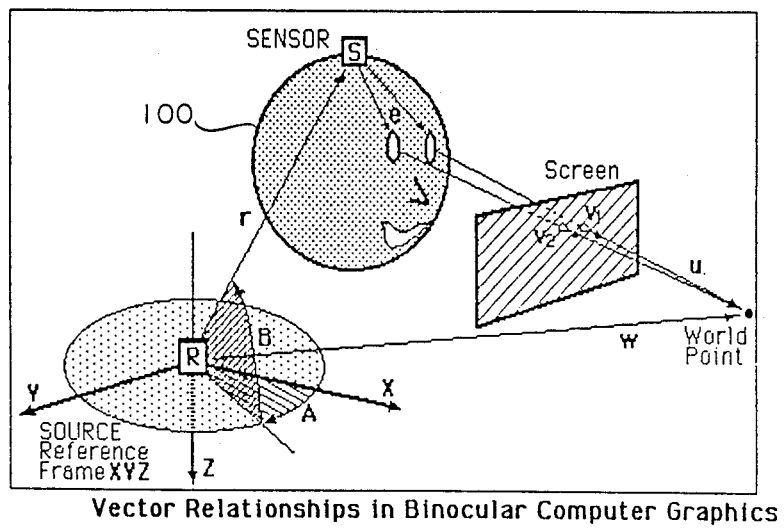
FIG. 7 illustrates the vector relationships in a binocular computer graphics application such as a flight simulator.

The vector relationships for a computer generated image of the local physical situation are illustrated in FIG. 7. A sensor S is shown fixed to the head of the viewer 100 and the source (or radiator) R is fixed with respect to the "world". Although only a single world-point is shown in FIG. 7, the world set consists of many such points, e.g., lines, edges, surfaces, etc. In this simplified discussion we assume all the world points to be fixed in the source frame.

The vector r, which defines the position of the viewer's head, is measured by the sensor. The vector e (actually, one for each eye, $e_1$ and $e_2$) defines the view-point which is fixed in the sensor frame. The vector $u_k = w - r - e_k$, is needed for the appropriate projection transformation onto the screen.

The screen, in this application, is also assumed to be fixed in the sensor frame. On the screen are shown two points, $v_1$ and $v_2$, both of which correspond to a single world point, w. However, the screen is assembled to be polarized or sensitized for each eye such that the left eye, $e_1$, sees only the screen image generated by the vector $u_1$, and the right eye $e_2$, sees only the image generated by $u_2$. Another way of accomplishing this would be to provide each eye with an independent CRT or fiber optic channel which would provide each independent binocular view. FIG. 7, illustrates the binocular vector relationships which are useful for at least the near-points in the specified world-set.

The vector w = a fixed world-point in the SOURCE frame $r = R \cos A \cos B \, i + R \sin A \cos B \, j - R \sin B \, k$ = Head position e = are fixed view-points (eyes) in the SENSOR frame u = view-point vectors in eye coordinates v = normalized vectors—image of world-point in screen coord.

In summary, the two crucial transformations required in computer graphics applications are the position and orientation transformations. These are represented by the components of the vector r and which also appear in the translation matrix (homogeneous coordinates) of Equation (48) and by the matrix A (or its equivalent quaternion representation) in the homogeneous coordinate rotation matrix of Equation (49).

And now with the relationship of the sensor frame to the source frame completely and "continuously" determined for both position and orientation, any one skilled in the computer graphics art can implement the CRT image point set.

This technique is considered particularly applicable to the generation of world images representative of the cockpit view of an aircraft pilot in a flight simulator. In this application, the sensor is mounted on a helmet or the like and the image generators may comprise a pair of CRT's which project computer generated images on the interior of the helmet visor. Alternately, polarized CRT screens may be mounted in forward field of view of the simulator. The source which establishes the reference coordinate frame is normally associated with the seat or reference coordinate frame of the simulator.

SOME RELATED QUATERNION OPERATIONS

The quaternions employed in this presentation were presumed normalized, that is, $$|q|^2 = q_0^2 + |\mathbf{q}|^2 = 1$$

then $q = q_0 + q$ and $q^{-1} = q_0 - q$ which simplifies the required quaternion operations.

We now define the quaternion product and some useful transformations which relate quaternions to direction cosines, the Euler angles, etc.

1. QUATERNION PRODUCT

The product of two quaternions, say, $a=pq$, as required in (43) is defined $$a = a_0 + a = (p_0+p)(q_0+q) = p_0q_0 + p_0q + q_0p + p \times q - p \cdot q \quad (51)$$

where $p \times q$ = conventional vector "cross" product
$p,q$ = conventional "dot" or scalar product and from this it follows that $$a_0 = p_0q_0 - p_1q_1 - p_2q_2 - p_3q_3$$

$$a_1 = p_0q_1 + p_1q_0 + p_2q_3 - p_3q_2$$

$$a_2 = p_0q_2 + p_2q_0 + p_3q_1 - p_1q_3$$

$$a_3 = p_0q_3 + p_3q_0 + p_1q_2 - p_2q_1$$

2. QUATERNION OPERATING ON A VECTOR

The quaternion q which operates on the vector $\bar{v}$ to produce a new vector $\bar{w}$, that is, $$w = q^{-1}vq$$

rotates the coordinate frame such that the vector $\bar{v}$ becomes $\bar{w}$. The new vector $\bar{w}$, in terms of the quaternion $q = q_0 + q$ and the vector $\bar{v}$ is $$w = (2q_0^2 - 1)v + 2(v,q)q + 2q_0(v \times q) \quad (52)$$

From this it can be seen that the new vector w is the vector sum of three components: a component in the direction of $\bar{v}$, a component in the direction of $\bar{q}$, and a component in a direction normal to $\bar{v}$ and $\bar{q}$.

A quaternion q can also operate on a set of vectors; then the notation is $$W = q^{-1}Vq = (2q_0^2 - 1)v_k + 2(v_k,q) + 2q_0(v_k \times q) \quad (53)$$

where k = the number of column vectors in V and therefore in W

3. THEOREM: A unitary quaternion, $p(|p|=1)$, may be represented in the form $$p = \cos(A/2) + u \sin(A/2)$$

where u = unit vector which defines the axis about which a single rotation, A, takes the vector v into the vector w according to the rule $$w = p^{-1}vp$$

Proof:

The vector $\bar{v}$ is taken into a new coordinate frame by the quaternion rotation operator, p, according to the rule $$w = p^{-1}vp = (p_0^2 - |p|^2)v + 2(v,p)p + 2p_0(v \times p)$$

where $|v| = |w|$ for all p and $p = p_0 + p$ with $|p| = 1$

Now let the vector $v = a + n$ and $\bar{p} = ka$, where vectors $\bar{a}$ and $\bar{n}$ are defined parallel (along) and normal, respectively, to the vector part of p, namely $\bar{p}$. Then it follows that $$\begin{aligned} w &= p^{-1}vp = a + (1 - 2k^2|a|^2)n + 2p_0k(n \times a) \\ &= a + (1 - 2|p|^2)n + 2p_0|p|b \end{aligned} \quad (B)$$

where $b = (n \times a)/|a|$

For p=1, the vectors $w = v = a + n$

For all p, the basis vectors $\bar{a}$, $\bar{n}$, and $\bar{b}$, and their respective coefficients in equation (B), provide the following useful geometric insights:

(1) The component a of v along p is invariant under these quaternion transformations.

(2) With vector a as the axis, vectors v and w may be viewed as generators of a right circular cone.

(3) The central angle between the two generators is defined by $$A = \arctan(2p_0|p|)/(1 - 2|p|^2)$$

hence $p_0 = \cos(A/2)$ and $|p| = \sin(A/2)$ and the theorem is proved.

It is to be understood that the above is merely a description of the preferred embodiments. It will be apparent to one skilled in the art that various modifications or improvements may be made without departing from the spirit of the invention disclosed herein. The scope of the protection afforded is to be determined by the claims which follow and the breadth of interpretation which the law allows.

The embodiments of the invention in which an exclusive property or privilege is claimed are defined as follows:

1. An apparatus for determining the position and orientation of a remote object relative to a reference coordinate frame comprising:

a plurality of radiating means for radiating electromagnetic energy, said radiating means having independent components defining a reference coordinate frame;

a transmitter means for applying to said plurality of radiating means electrical signals which generate a plurality of radio frequency electromagnetic fields, said electromagnetic fields being distinguishable from one another;

receiving means for receiving said transmitted electromagnetic fields, said receiving means being disposed on a remote object and said receiving means having a plurality of independent components for detecting each of said transmitted electromagnetic fields; and analyzing means for receiving the output of said receiving means and converting the components of said transmitted electromagnetic fields received by said receiving means into remote object position and orientation relative to said reference coordinate frame, said analyzing means including means for processing the components of said electromagnetic fields with quaternions.

2. An apparatus for determining the position and orientation of a remote object relative to a reference coordinate frame comprising:
- a plurality of radiating means for radiating electromagnetic energy, said radiating means having independent components defining a reference coordinate frame;
- a transmitter means for applying to said plurality of radiating means electrical signals which generate a plurality of radio frequency electromagnetic fields, said electromagnetic fields being distinguishable from one another;
- receiving means for receiving said transmitted electromagnetic fields, said receiving means being disposed on a remote object and said receiving means having a plurality of independent components for detecting each of said transmitted electromagnetic fields; and
- analyzing means for receiving the output of said receiving means and converting the components of said transmitted electromagnetic fields received by said receiving means into remote object orientation relative to said reference coordinate frame, said analyzing means including means for processing the components of said electromagnetic fields into remote object orientation independently of remote object position.

3. An apparatus for determining the position and orientation of a remote object relative to a reference coordinate frame comprising:
- a plurality of radiating means for radiating electromagnetic energy, said radiating means having independent components defining a reference coordinate frame;
- a transmitter means for applying to said plurality of radiating means electrical signals which generate a plurality of radio frequency electromagnetic fields, said electromagnetic fields being distinguishable from one another;
- receiving means for receiving said transmitted electromagnetic fields, said receiving means being disposed on a remote object and said receiving means having a plurality of independent components for detecting each of said transmitted electromagnetic fields; and
- analyzing means for receiving the output of said receiving means and converting the components of said transmitted electromagnetic fields received by said receiving means into remote object position and orientation relative to said reference coordinate frame, said analyzing means including means for processing the components of said electromagnetic fields into at least one of remote object position and orientation with quaternions.

4. The apparatus of claim 3 wherein said means for processing includes means for determining both remote object position and remote object orientation with quaternions.

5. The apparatus of claim 4 wherein said means for processing includes means for simultaneously determining remote object position and remote object orientation in a parallel process.

6. The apparatus of claim 5 further including means for mounting said receiving means on the head of a user;
viewing means for generating an image viewed by a user; and
said means for processing further including means for generating a world image on said viewing means, the world image being associated with said reference coordinate frame and corrected according to the position and orientation of said receiving means.

7. The apparatus of claim 6 wherein said viewing means and said means for processing further comprise means for providing a binocular world image.

8. A method for determining the position and orientation of a remote object relative to a reference coordinate frame comprising:
- providing a source of electromagnetic radiation including a plurality of radiating means for radiating electromagnetic energy, said radiating means having independent components defining a reference coordinate frame;
- applying multiplexed electrical signals to said radiating means and thus transmitting a set of distinguishable electromagnetic fields;
- providing a sensor including a plurality of receiving means disposed on a remote object for receiving said electromagnetic fields and generating a set of signals that is representative of the received components of said electromagnetic fields; and
- processing said set of signals into remote object position and orientation with quaternions.

9. A method for determining the position and orientation of a remote object relative to a reference coordinate frame comprising:
- providing a source of electromagnetic radiation including a plurality of radiating means for radiating electromagnetic energy, said radiating means having independent components defining a reference coordinate frame;
- applying multiplexed electrical signals to said radiating means and thus transmitting a set of distinguishable electromagnetic fields;
- providing a sensor including a plurality of receiving means disposed on a remote object for receiving said electromagnetic fields and generating a set of signals that is representative of the received components of said electromagnetic fields; and
- processing said set of signals into remote object orientation independently of remote object position.

10. A method for determining the position and orientation of a remote object relative to a reference coordinate frame comprising:
- providing a source of electromagnetic radiation including a plurality of radiating means for radiating electromagnetic energy, said radiating means having independent components defining a reference coordinate frame;
- applying multiplexed electrical signals to said radiating means and thus transmitting a set of distinguishable electromagnetic fields;
- providing a sensor including a plurality of receiving means disposed on a remote object for receiving said electromagnetic fields and generating a set of signals that is representative of the received components of said electromagnetic fields; and
- processing said set of signals into at least one of remote object position and orientation with quaternions.

11. The method of claim 10 wherein said processing step further comprises the step of determining both remote object position and remote object orientation with quaternions.

12. The method of claim 11 wherein said processing step further comprises the step of simultaneously determining remote object position and orientation in a parallel process.

13. The method of claim 12 further comprising the steps of:
   mounting said receiving means on the head of a user;
   providing a viewing means for generating an image viewed by a user; and
   generating a world image on said viewing means, said world image being associated with said reference coordinate frame and corrected according to the position and orientation of said receiving means.

14. The method of claim 13 further comprising the step of providing a binocular world image.

15. A method for determining the position and orientation of a remote object relative to a reference coordinate frame comprising:
   providing a source of electromagnetic radiation including a plurality of radiating means for radiating electromagnetic energy said radiating means having independent components defining a source reference coordinate frame;
   applying multiplexed electrical signals to said radiating means and thus transmitting a set of distinguishable electromagnetic fields;
   providing a sensor including a plurality of receiving means disposed on a remote object for defining a sensor reference coordinate frame and for receiving said electromagnetic fields and generating a signal matrix S that is representative of the received components of said electromagnetic fields;

normalizing signal matrix $S = kAP^tHP$;

where
   k = an attenuation factor which is a function of the separation distance between the radiating means and the receiving means;
   A = an orientation matrix which defines the sensor frame relative to the source frame;
   p = a tracking matrix;
   H = a relative electromagnetic field coupling matrix means
to give $$M = AP^tHP = \frac{1}{k} S;$$

where
   $k = [\text{trace } (S^tS)/6]^{\frac{1}{2}}$
   determining a distance R which is the separation distance between the radiating means and the receiving means;
where $$R = R_o \left(\frac{k_o}{k}\right)^{\frac{1}{3}}$$

$R_o$ = a reference separation distance
   $k_o$ = a corresponding reference attenuation factor
   determining $X = (M^tM - I)/3$; and
   determining $A^t = M^t - 2M^{-1}$
where
   $X = P^tE_1P$
   $E_1$ = a zero matrix except for $e_{11} = 1$ whereby three independent algorithms are provided for the distance R, the orientation matrix A, and a position-related matrix X.

16. The method of claim 15 further including the steps of:
   determining $$x = R\sqrt{x_{11}}$$

$$y = R\sqrt{x_{22}} \text{ sgn}(x_{21})$$

$$z = R\sqrt{x_{33}} \text{ sgn}(x_{31})$$

where (X,Y,Z) are the position coordinates of the receiving means in the radiating means reference coordinate frame.

17. The method of claim 15 further including the steps of:
   determining A = transpose of ($A^t$) which is equal to the direction cosine matrix;
   determining
      $\sin E = -a_{13}$
      $\tan iH = a_{12}/a_{11}$
      $\tan R = a_{23}/a_{33}$
   where H, E, R are the Euler angles for heading, elevation and roll, respectively, of the receiving means reference coordinate frame relative to the radiating means reference coordinate frame.

18. The method of claim 15 further including the steps of:
   determining $A^tM = M^tM - 2I = Y$
   determining $\underline{a}^{-1}Y\underline{a} = uMu^{-1}$
      where $\underline{a} = au^{-1} =$ an estimate of a quaternion a
      u = an error quaternion in a,
   determining $uMu^{-1} = (I - 2U)M$
   where U = is a matrix of the components of the error quaternion u
   determining a next estimate of $a_{new} = a_{old}u$; and
   repeating the process to determine an error free orientation quaternion a.

19. The method of claim 15 further including the steps of:

determining $X = P^tE_1P$
   $= p(E_1P)p^{-1}$ determining $X1 = p^{-1}(X)p = c(E_1P)c^{-1} = (I - 2C)E_1P$
   where actual tracking quaternion p = pc, and
   p = the estimated tracking quaternion
   c = the error quaternion in the estimate
   C = an error matrix whose elements are in the error quaternion c namely $C = \begin{bmatrix} 0 & c_3 & -c_2 \\ -c_3 & 0 & c_1 \\ c_2 & -c_1 & 0 \end{bmatrix}$ -continued $$\text{determining } X2 = (X1)^t = P^t E_1 (I + 2C)$$
$$= p[E_1(I + 2C)]p^{-1}$$
$$\text{determining } X3 = p^{-1}(X2)p = c[E(I + 2C)]c^{-1}$$
$$= (I + 2C)E_1(I - 2C)$$
$$\text{determining } X3 = E_1 + 2E_1C - 2CE_1 - ACE_1C$$

$$= \begin{bmatrix} 1 & 2C_3 & -2C_2 \\ 2C_3 & 0 & 0 \\ -2C_2 & 0 & 0 \end{bmatrix}$$

where the term $-4CE_1C$ is assumed negligible thus defining the tracking error quaternion $$C = (1, 0, C_2, C_3)$$

then determining the new estimate for the tracking quaternion p as:

$$\underline{p}_{new} = \underline{p}_{old} c$$

and repeating the process until $C_o = 1$ and $\overline{C}$ approaches zero.

20. The method of claim 15 further including the steps of:
determining $$x = R\sqrt{x_{11}}$$

$$y = R\sqrt{x_{22}} \, \text{sgn}(x_{21})$$

$$z = R\sqrt{x_{33}} \, \text{sgn}(x_{31})$$

where (x,y,z) are the position coordinates of the recieving means in the radiating means reference coordinate frame;
determining A = transpose of ($A^t$) which is equal to the direction cosine matrix;
determining
$\sin E = -a_{13}$
$\tan H = a_{12}/a_{11}$
$\tan R = a_{23}/a_{33}$
where H, E, R are the Euler angles for heading, elevation and roll, respectively, of the receiving means reference coordinate frame relative to the radiating means reference coordinate frame;
providing first and second parallel processors; and
simultaneously determining orientation and position in said first and second processors, respectively.

21. The method of claim 15 further including the steps of:
determining $$x = R\sqrt{x_{11}}$$

$$y = R\sqrt{x_{22}} \, \text{sgn}(x_{21})$$

$$z = R\sqrt{x_{33}} \, \text{sgn}(x_{31})$$

where (x,y,z) are the position coordinates of the receiving means in the radiating means reference coordinate frame;
determining A = transpose of ($A^t$) which is equal to the direction cosine matrix;
determining
$\sin E = -a_{13}$
$\tan H = a_{12}/a_{11}$
$\tan R = a_{23}/a_{33}$
where H, E, R are the Euler angles for heading, elevation and roll, respectively, of the receiving means reference coordinate frame relative to the radiating means reference coordinate frame.

22. The method of claim 15 further including the steps of:
determining $M = AP^t HP = QHP$
when $Q = AP^t$
determining $M = q^{-1}[H(p^{-1}Ip)]q$
where q = the quaternion representative of Q
p = the quaternion representation of P
$q = ap^{-1}$
and a = the quaternion representation of A
determining estimates for quaternions p and q denoted $\underline{p}$ and $\underline{q}$, respectively
where $p = \underline{p}c^{-1}$
and $q = e^{-1}\underline{q}$
where c = error in quaternion p
and e = error in quaternion q
determining $M4 = \underline{p}[H^{-1}(\underline{q}M\underline{q}^{-1})]^t\underline{p}^{-1}$;
determining error quaternions $c_k$'s and $e_k$'s from M4
determining new letter estimates for p and q,
namely $\underline{p}_{new} = \underline{p}_{old} c$
and $\underline{q}_{new} = e \, \underline{q}_{old}$
and repeating the process with these new estimates until the vector part of the error quaternions approach zero.

23. A method for determining the position and orientation of a remote object relative to a reference coordinate frame comprising:
providing a source of electromagnetic radiation including a plurality of radiating means for radiating electromagnetic energy said radiating means having independent components defining a source reference coordinate frame;
applying multiplexed electrical signals to said radiating means and thus transmitting a set of distinguishable electromagnetic fields;
providing a sensor including a plurality of receiving means disposed on a remote object for defining a sensor reference coordinate frame and for receiving said electromagnetic fields and generating a signal matrix S that is representative of the received components of said electromagnetic fields;
normalizing said signal matrix $S = kAP^t HP$;
where k = an attenuation factor which is a function of the separation distance between the radiating means and the receiving means;
A = an orientation matrix which defines the sensor frame relative to the source frame;
P = a tracking matrix;
H = a relative electromagnetic field coupling matrix means
to give $M = AP^t HP = 1/kS$;
determining $A^t = M^t - 2M^{-1}$
whereby the orientation matrix A is determined independently of position parameters.

24. The method of claim 23 further including the steps of:

determining A=transpose of $(A^t)$ which is equal to the direction cosine matrix;
determining
sin $E = -a_{13}$
tan $H = a_{12}/a_{11}$
tan $R = a_{23}/a_{33}$
where H, E, R are the Euler angles for heading, elevation and roll, respectively, of the receiving means reference coordinate frame relative to the radiating means reference coordinate frame.

25. The method of claim 23 further including the steps of:
determining $A^tM = M^tM = 2I = Y$
determining $\underline{a}^{-1}Y a = uMu^{-1}$
where $\underline{a} = au^{-1}$ = an estimate of a quaternion a
u = an error quaternion in a
determining $uMu^{-1} = (I - 2U)M$
where U = is a matrix of the components of the error quaternion u
determining a next estimate of $\underline{a}_{new} = \underline{a}_{old} u$; and
repeating the process to determine an error free orientation quaternion a.

26. A method for determining the position and orientation of a remote object relative to a reference coordinate frame comprising:
providing a source of electromagnetic radiation including a plurality of radiating means for radiating electromagnetic energy said radiating means having independent components defining a source reference coordinate frame;
applying multiplexed electrical signals to said radiating means and thus transmitting a set of distinguishable electromagnetic fields;
providing a sensor including a plurality of receiving means disposed on a remote object for defining a sensor reference coordinate frame and for receiving said electromagnetic fields and generating a signal matrix S that is representative of the received components of said electromagnetic fields;
normalizing said signal matrix $S = kAP^tHP$;
where k = an attenuation factor which is a function of the separation distance between the radiating means and the receiving means;
A = an orientation matrix which defines the sensor frame relative to the source frame;
P = a tracking matrix;
H = a relative electromagnetic field coupling matrix means;
to give $M = AP^tHP = 1/kS$;
determining $X = (M^tM - I)/3$;
where $X = P^t E_1 P$
$E_1$ = a zero matrix except for $e_{11} = 1$ whereby a position-related matrix X is determined independently of orientation parameters.

27. The method of claim 26 further including the steps of:
determining a distance R which is the separation distance between the radiating means and the receiving means;
where $$R = R_o \left(\frac{k_o}{k}\right)^{\frac{1}{2}}$$

$R_o$ = a reference separation distance
$k_o$ = a corresponding reference attenuation factor
determining $$x = R\sqrt{x_{11}}$$

$$y = R\sqrt{x_{22}} \, \text{sgn}(x_{21})$$

$$z = R\sqrt{x_{33}} \, \text{sgn}(x_{31})$$

whee (X,Y,Z) are the position coordinates of the receiving means in the radiating means reference coordinate frame.

28. The method of claim 26 further including the steps of:
determining $X = P^t E_1 P = p(E_1 P) p^{-1}$
determining $X1 - \underline{p}^{-1}(X)\underline{p} = c(E_1 P)c^{-1} = (I - 2C)E_1 P$
where actual tracking quaternion $p = \underline{p}c$, and
$\underline{p}$ = the estimated tracking quaternion
$\bar{c}$ = the error quaternion in the estimate
c = an error matrix whose elements are in the error quaternion c $$\text{namely } C = \begin{bmatrix} 0 & c_3 & -c_2 \\ -c_3 & 0 & c_1 \\ c_2 & -c_1 & 0 \end{bmatrix}$$

determining $X2 = (X1)^t = p^t E_1 (I + 2C)$
$= p[E_1(I + 2C)]p^{-1}$
determining $X3 = p^{-1}(X2)p = c[E(I + 2C)]c^{-1}$
$= (I + 2C)E_1(I - 2C)$
determining $X3 = E_1 + 2E_1C - 2CE_1 - ACE_1C$ $$= \begin{bmatrix} 1 & 2c_3 & -2c_2 \\ 2c_3 & 0 & 0 \\ -2c_2 & 0 & 0 \end{bmatrix}$$

where the term $-4CE_1C$ is assumed negligible thus defining the tracking error quaternion $\bar{c} = (1, 0, c_2, c_3)$ then determining the new estimate for the tracking quaternion p as:

$\underline{p}_{new} = \underline{p}_{old} \bar{c}$ and repeating the process until $c_o = 1$ and $\bar{c}$ approaches zero.

* * * * *

UNITED STATES PATENT AND TRADEMARK OFFICE
CERTIFICATE OF CORRECTION

PATENT NO. : 4,742,356        Page 1 of 4
DATED     : May 3, 1988
INVENTOR(S) : Jack Kuipers It is certified that error appears in the above-identified patent and that said Letters Patent is hereby corrected as shown below:

Column 10, line 3:

"$(X1) = p^{-1}Xp = c(E_1 P)c^{-1}$" should be -- $(X1) = \underline{p}^{-1}X\underline{p} = c(E_1 P)c^{-1}$ -- ;

Column 10, line 26:

"$p^{-1}[(X1)^t]p$" should be -- $\underline{p}^{-1}[(X1)^t]\underline{p}$ -- ;

Column 12, line 11:

After quaternion "$a = a_o + a,$" should be -- $a = a_o + \overline{a},$ -- ;

Column 12, line 24:

After quaternion "$u = u_o + u$" should be -- $u = u_o + \overline{u}$ -- ;

Column 12, line 39; and line 54:

After quaternion "$u = u_o + u$" should be -- $u = u_o + \overline{u}$ -- ;

Column 13, line 24:

"q and p" should be --$\underline{q}$ and $\underline{p}$-- ;

Column 13, line 27:

"$q = e\overline{q}$ or $\underline{q} = e^{-1}q$  (35)" should be --$\underline{q} = eq$ or $\underline{q} = e^{-1}q$   (35) -- ;

Column 13, line 31:

After "or" "$p = \underline{p}c^{-1}$" should be -- $\underline{p} = pc^{-1}$ -- ;

Column 13, line 44:

"the" should be --this--;

UNITED STATES PATENT AND TRADEMARK OFFICE
CERTIFICATE OF CORRECTION

PATENT NO. : 4,742,356

DATED : May 3, 1988

INVENTOR(S) : Jack Kuipers

It is certified that error appears in the above-identified patent and that said Letters Patent is hereby corrected as shown below:

Column 13, line 65:

"$M4 = \underline{p}^{-1}(M3)p = c(1-2Z)c^{-1}$" should be --$M4 = \underline{p}^{-1}(M3)\underline{p} = c(1-2Z)c^{-1}$--;

Column 14, line 4:

"$= [\underline{p}^{-1}(H^{-1}(\underline{q}M\underline{q}^{-1})]^t p]$" should be --$[\underline{p}^{-1}(H^{-1}(\underline{q}M\underline{q}^{-1})]^t \underline{p}]^t$-- ;

Column 14, line 36:

"$P = P_{new} = (P_{old})c \quad q = q_{new} = (q_{old})e$" should be

--$\underline{p} = \underline{p}_{new} = (\underline{p}_{old})c \quad \underline{q} = \underline{q}_{new} = (\underline{q}_{old})e$--

Column 15, line 40:

After equation for "Translation" insert -- (48) --;

Column 15, line 45:

After equation for "Rotation" insert -- (49) --;

Column 15, line 44:

"Rotation = [ A | Y ]" should be -- Rotation = [ A | 0 ] --

Column 17, line 36:

"$q = q_o + q$" should be -- $q = q_o + \overline{q}$ -- ;

UNITED STATES PATENT AND TRADEMARK OFFICE
CERTIFICATE OF CORRECTION

PATENT NO. : 4,742,356
DATED : May 3, 1988
INVENTOR(S) : Jack Kuipers

It is certified that error appears in the above-identified patent and that said Letters Patent is hereby corrected as shown below:

Column 18, line 4:

"v" should be --$\bar{v}$--;

Column 18, line 16:

"w = v = a + n" should be --$\bar{w} = \bar{v} = \bar{a} + \bar{n}$--;

Column 22, Claim 18, line 44:

"$a_{new} = a_{old}$ u" should be -- $\underset{\sim}{a}_{new} = \underset{\sim}{a}_{old}$ u --;

Column 22, Claim 19, line 57:

"pc" should be --$\underset{\sim}{p}c$--;

Column 22, Claim 19, line 58:

"p" should be --$\underset{\sim}{p}$--;

Column 23, Claim 19, line 6:

"$p^{-1}(X2)p$" should be -- $\underset{\sim}{p}^{-1}(X2)\underset{\sim}{p}$ --;

Column 25, Claim 25, line 13:

"$M^tM = 2I = Y$" should be -- $M^tM-2I = Y$ --;

Column 26, Claim 27, line 17:

"whee" should be --where--;

Column 26, Claim 28, line 24:

"X1 - $\underset{\sim}{p}$" should be -- X1 = $\underset{\sim}{p}$ --;

UNITED STATES PATENT AND TRADEMARK OFFICE
CERTIFICATE OF CORRECTION

PATENT NO. : 4,742,356

DATED : May 3, 1988

INVENTOR(S) : Jack Kuipers

It is certified that error appears in the above-identified patent and that said Letters Patent is hereby corrected as shown below:

Column 26, Claim 28, line 40:

"$X3 = p^{-1}(X2)p$" should be -- $X3 = \underline{p}^{-1}(X2)\underline{p}$ --.

Signed and Sealed this

Twenty-ninth Day of November, 1988

*Attest:*

DONALD J. QUIGG

*Attesting Officer*     *Commissioner of Patents and Trademarks*